United States Patent [19]

Kubota

[11] Patent Number: 5,053,879
[45] Date of Patent: Oct. 1, 1991

[54] METHOD AND DEVICE FOR DETERMINING SHADING CORRECTION DATA, AND FOR EFFECTING SHADING CORRECTION IN VIDEO PRINTER

[75] Inventor: Kazufumi Kubota, Kanagawa, Japan

[73] Assignee: Fuji Photo Film Co., Ltd., Kanagawa, Japan

[21] Appl. No.: 201,721

[22] Filed: Jun. 3, 1988

[30] Foreign Application Priority Data

Jun. 5, 1987 [JP] Japan ................... 62-141249

[51] Int. Cl.⁵ .................... H04N 5/84; H04N 3/23
[52] U.S. Cl. ......................... 358/244; 358/163; 358/76; 354/76
[58] Field of Search .......... 358/224, 244.1, 244.2, 358/80, 302, 332, 333, 345-346, 347, 348, 909, 906, 163; 346/110 R; 354/75, 76

[56] References Cited

U.S. PATENT DOCUMENTS

| | | | |
|---|---|---|---|
| 4,433,345 | 2/1984 | Haddick et al. | 358/345 |
| 4,468,693 | 8/1984 | Fujita et al. | 360/14.3 |
| 4,473,849 | 9/1984 | Cool | 358/32 |
| 4,757,334 | 6/1988 | Volent | 358/244 |
| 4,766,503 | 8/1988 | Lambert et al. | 358/244.1 |
| 4,786,756 | 10/1988 | Shiota et al. | 358/11 |
| 4,794,460 | 12/1988 | Shiota | 358/244 |
| 4,802,007 | 1/1989 | Van der Brug | 358/139 |

*Primary Examiner*—Roy N. Envall, Jr.
*Assistant Examiner*—Huy Nguyen
*Attorney, Agent, or Firm*—Sughrue, Mion, Zinn, Macpeak & Seas

[57] ABSTRACT

A method and device for shading correction used in a video printer comprises a TV camera for providing image data of a subject to be printed and an exposure display means such as an exposure CRT for displaying the image data thereon and to which photographic paper is exposed to make a video print of the subject. The method of shading correction comprises the steps of making a video print of a reference subject with an uniform density using the video printer, obtaining the difference between image data of the video print and the image data of the reference subject as shading correction data, and adding the shading correction data and the image data of a subject to be printed, thereby effecting shading correction for a video print of the subject made by the video printer. In carrying out the shading correction method, the shading correction device employs a memory for storing the shading correction data, a frame memory for storing image data of a subject to be printed and a device for adding the shading correction data read out from the memory and the image data read out from the frame memory.

5 Claims, 2 Drawing Sheets

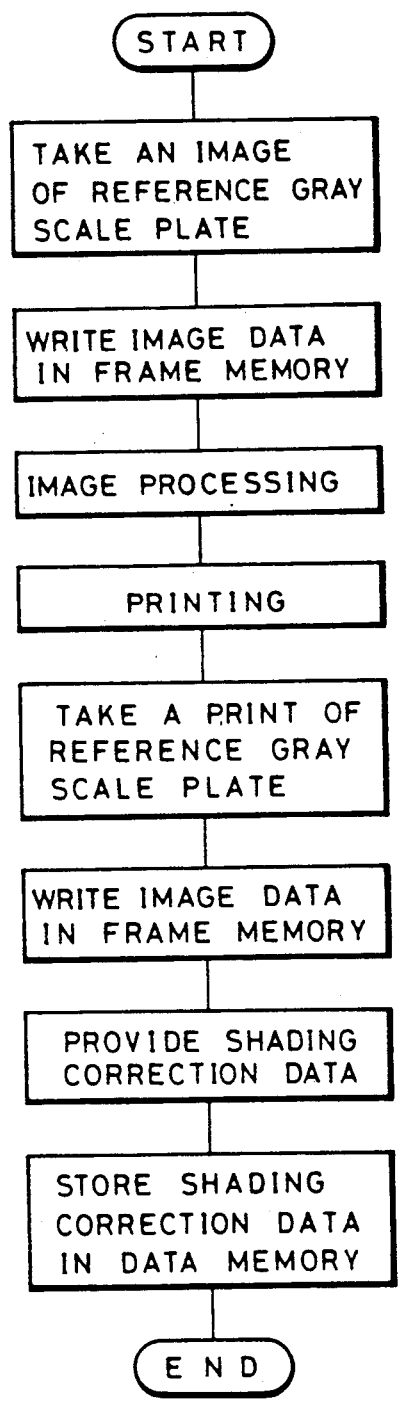
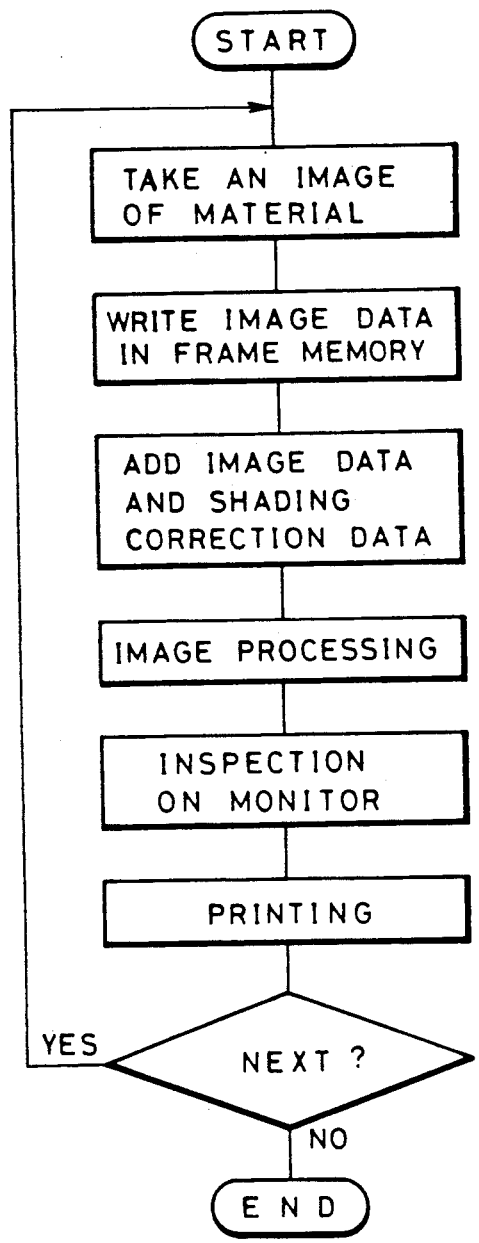
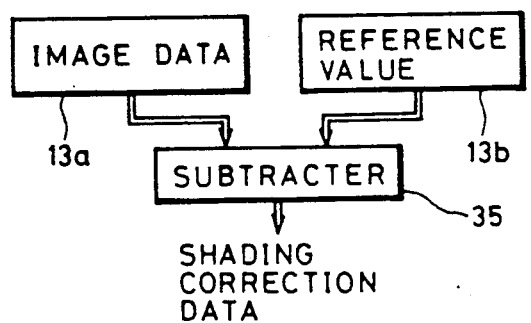

METHOD AND DEVICE FOR DETERMINING SHADING CORRECTION DATA, AND FOR EFFECTING SHADING CORRECTION IN VIDEO PRINTER

BACKGROUND OF THE INVENTION

The present invention relates to a method and device for shading correction in video printers.

A video printer comprises a TV camera for obtaining an image of a subject, for example, pictures, documents or figures, as image data, image processing means for processing the image data from the TV camera, and printing means including an image display device such as a CRT display device on which the processed image data are displayed as a visible image, to which photographic paper is exposed to make a video print of the subject.

In such a video printer as well as the various optical image producing instruments, the image provided for the photographic exposure is shaded in compliance with the optical characteristic of the TV camera lens, the photoelectric transfer characteristic of the image sensor or pick-up tube of the TV camera, the luminance characteristic of the exposure CRT, the optical characteristics of the printing lens, etc., or various combinations thereof.

For effective shading correction in video printers. TV cameras and exposure CRTs have to be finely regulated in their characteristics. Such fine regulation demands skill and, therefore, is quite troublesome.

OBJECT OF THE INVENTION

It is therefore an object of the present invention to provide a method and device for shading correction which allows shading correction without special skill or troublesome operation.

SUMMARY OF THE INVENTION

For accomplishing the above object, the present invention provides a method of effecting shading correction in a video printer which has a TV camera for obtaining an image of a subject to be printed and an exposure display means such as an exposure CRT for displaying the image of the subject, to which photographic paper is exposed. The method comprises the steps of making a video print of a reference subject having a uniform density, such as a gray scale, using the video printer, obtaining the difference between the image data of the video print of the reference subject and reference image data such as image data of the gray scale provided by the TV camera under standard conditions, as shading correction data, and adding the shading correction data and the image data of the subject to be printed, to thereby effect shading correction for the video printer and produce a video print of the subject without shading.

To enable the above method, the present invention provides a shading correction device comprising a shading correction data memory in which shading correction data is stored, frame memory means for storing image data of the subject provided by the TV camera, and means for adding the image data read out from the frame memory means and the shading correction data read out from the shading correction data memory.

According to another feature of the present invention the method and device for effecting shading correction can be realized using only a memory in which shading correction data is stored pel by pel, and means for adding the shading correction data and the image data of a subject taken by the TV camera.

BRIEF DESCRIPTION OF THE DRAWINGS

FIG. 2 is a functional block diagram illustrating a controller for providing shading correction data;

FIG. 3 is a flow chart showing the sequence of providing shading correction data; and FIG. 4 is a flow chart showing a video printing sequence.

DETAILED DESCRIPTION OF THE INVENTION

Figure 1:
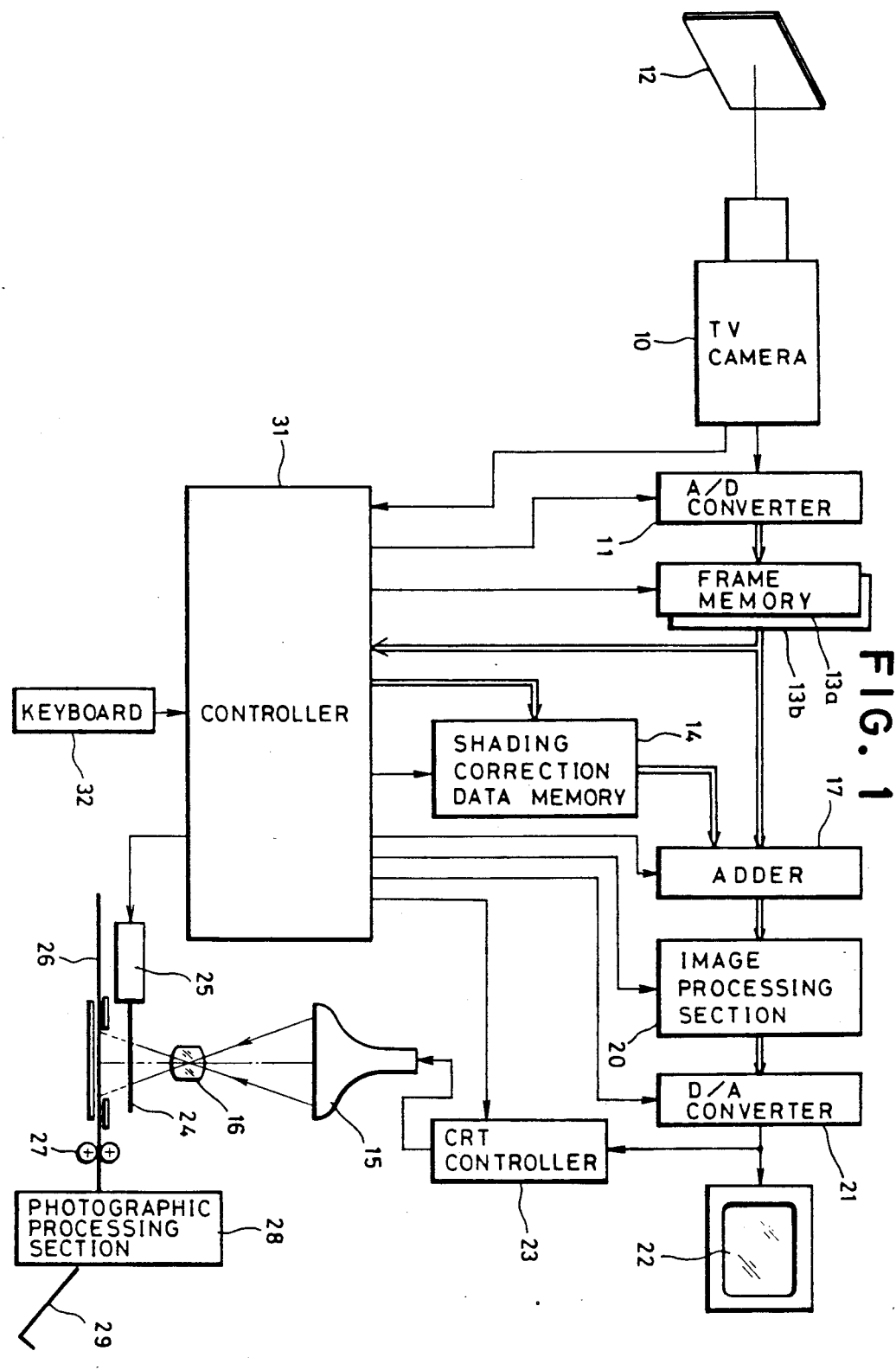
FIG. 1 is a block diagram illustrating a video printer embodying the present invention.

Referring now to FIG. 1 showing a video printer of a preferred embodiment according to the present invention, a TV camera 10 obtains an image of a subject such as a picture or a document and provides video signals on the subject which are sent to A/D converter 11. To provide data for shading correction, images of a reference subject with uniform density such as a gray scale plate 12, and a photographic print of the gray scale plate 12, are taken by the TV camera 10. The image data output from the A/D converter 11 is stored in a frame memory 13a or 13b, which are synchronized with the TV camera 10.

In a shading correction data memory 14 there are written data necessary to correct for shading caused according to the characteristics of the TV camera 10, an exposure CRT 15 used as exposure display means such as a black-and-white CRT. the printing lens 16, etc. An adder 17 is provided to add the shading correction data read out from the shading correction data memory 14 and the image data from the frame memory 13a or 13b, to effect shading correction. A back-lit liquid-crystal display means or the like may be used as the exposure display means.

The image data output from the adder 17 is sent to an image processing section 20 wherein image processing such as gradation correction and/or image composition takes place with the resulting data transferred to D/A converter 21 to be converted into image data in analog form. Image data in the form of an analog image signal is sent to both a monitor 22 such as a color CRT display unit and a CRT controller 23 which drives the black-and-white CRT 15 to display a black-and-white CRT image corresponding to the image data. A shutter 24 is controlled by a shutter controller 25 to open for a predetermined time to allow photographic paper 26 to be exposed to the black-and-white CRT image displayed on the black-and-white CRT 15 through a printing lens 16. After this exposure, the photographic paper 26 is transported to a photographic processing section 28 by means of a pair of conveying rollers 27 wherein it is developed and cut to form an individual video print. The video print thus processed and cut is delivered to a tray 29.

The controller 31 on one hand, controls the conversion of signals in the A/D converter 11 and the image data storage in the frame memory 13a or 13b using synchronizing signals for the TV camera 10 and, on the other hand, controls the frame memory 13a or 13b. the shading correction data memory 14, the image signal processing section 20, the D/A converter 21, the CRT controller 23 and the shutter controller 24. A keyboard 32 has various keys for switching the video printer between a shading correction data generation mode and a video printing mode and for entering instructions for carrying out image processing.

FIG. 2 is a block diagram illustrating the function of the controller 31 in providing shading correction data. In FIG. 2, in a memory 13b there is stored standardized data which is obtained via imaging of a reference subject such as a reference gray scale plate 12, taken by the TV camera 10 under standard conditions. When the video printer is in the shading correction data generation mode, there is stored in the frame memory 13a the image data obtained by obtaining an image of the video print of the reference gray scale plate 12 using the TV camera. The image data in the frame memory 13a and the standardized data stored in the memory 13b are transferred to a subtractor 35 wherein subtraction of one from the other is effected for each picture element to provide shading correction data which in turn is written in the shading correction data memory 14.

In the operation of the video printer constructed as described above, the video printer carries out video printing after having provided shading correction data. When providing shading correction data, the video printer is switched to the shading correction data generation mode by operating a key on the keyboard 32. The image of a reference gray scale plate 12, placed in an image pick-up position, is taken by the TV camera 10. Image signals output from the TV camera 10, as was previously described, are converted into digital form and then written in the frame memory 13b.

In the shading correction data generating mode, because no data is read out from the shading correction data memory 14, only the image data read out from the frame memory 13b is transferred to the image processing section 20 via the adder 17 for gradation correction, etc. The image data output from the image processing section 20 is converted into analog form by the D/A converter 21 and sent to the black-and-white CRT 15 via the CRT controller 23. While the black-and-white CRT 15 is displaying a black-and-white image of the reference gray scale plate 12 as a reference subject thereon, the shutter 24 is opened for a certain period of time to expose the photographic paper 26 to the black-and-white image of the reference gray scale plate 12 displayed on the black-and-white CRT 15 through the printing lens 16. After this exposure, the photographic paper 26 is transported to the photographic processing section 28 for development and, thereafter, provided as a video print which is delivered to the tray 29.

Next, this video print is placed in the image pick-up position in place of the reference gray scale plate 12; and an image thereof is obtained by the TV camera 10. Image signals output from the TV camera 10 are written in the frame memory 13a. Thereafter, the controller 31 reads out the image data picture element by picture element in order from the frame memory 13a and sends it to the subtractor 35 wherein the image data read out from the frame memory 13a is subtracted from the standardized data read out from the memory 13b. The resultant data is written as shading correction data in the shading correction data memory 14.

The keyboard 32 is then operated again to switch the video printer to the video printing mode. As shown in FIG. 4, in this video printing mode, the subject to be printed is placed in the image pick-up position. As was previously described, an image of the subject is taken by the TV camera 10 to provide image data of subject which is stored in the frame memory 13a. Then, the controller 31 simultaneously reads out the frame memory 13a and the shading correction data memory 14 to send the read out data to the adder 17 to add them together picture element by picture element in order to effect shading correction. The image data obtained via shading correction is subjected to image processing (such as gradation correction, positive-negative reversal, image magnification or reduction, or image insertion composition). The image data, after having been processed, is converted into analog form by the D/A converter 21 and sent to both the monitor 22 and the CRT controller 23.

After visual inspection of the image of the subject displayed on the monitor 22, the keyboard 32 is operated to start video printing. The CRT controller 23 causes the black-and-white CRT 15 to display the processed image data as a black-and-white CRT image thereon in order to expose the photographic paper 26 to the black-and-white CRT image. The exposed photographic paper 26 is transported to the photographic processing section 28 for development. After development, the photographic paper 26 is cut to provide a video print.

As is apparent from the above description, since the shading correction data is provided before carrying out video printing, even when the shading of an image displayed on the black-and-white CRT 15 changes due, for example, to changes in the optical characteristics of the printing lens 16 due to aging, or to the conditions of lighting the subject, proper shading correction is easily effected. When there is little change in optical characteristics of the printing lens 16 due to aging, it is permissible to provide a ROM memory in each video printer and to write shading correction data peculiar to the video printer in the ROM memory before shipping the video printer.

Although the above description has been directed to a black-and-white video printer, the present invention can be applied to color video printers with the same result. In a color video printer, color signals are separately written in a frame memory for each of the three colors, namely red, green and blue. For effecting image processing in color, the color video printer is provided with three sets of shading correction data memories and adders, one set for each individual color.

Instead of providing shading correction data for each picture element, it is permissible to provide shading correction data for groups of picture elements into which an original is arbitrarily divided. This allows generation of the shading correction data with ease and the use of a small capacity memory, making it possible to manufacture video printers at low cost.

Although the present invention has been fully described by way of the preferred embodiment thereof with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A shading correction method for use in a video printer of the type including a TV camera for providing image data of a subject to be printed and exposure display means for displaying said image data thereon as a video image, to which a photographic medium is exposed to make a video print of said video image, said shading correction method comprising the steps of:
- making a video print of a reference subject of uniform density using said video printer;
- obtaining the difference between image data of said video print of said reference subject as taken by said TV camera and image data of said reference subject as taken by said TV camera as shading correction data; and
- adding said shading correction data and image data of a subject taken by said TV camera, to effect shading correction for the video print of the subject.

2. A shading correction method as claimed in claim 1, wherein said exposure display means is a black-and-white CRT.

3. A shading correction method as claimed in claim 2, wherein said reference subject is a gray scale plate of uniform density.

4. A shading correction device for a video printer, comprising; a TV camera for providing image data of a subject to be printed, a frame memory for storing said image data, an exposure CRT for displaying image data to be photographically reproduced to make a video print of said subject, said shading correction device comprising:
- memory means in which shading correction data is memorized;
- means for obtaining a difference between image data of a reference subject taken by said TV camera under standardized conditions, and image data of a video print of said reference subject made by said video printer, to provide said shading correction data which is memorized in said memory means; and
- means for adding said shading correction data read out from said memory means and said image data read out from said frame memory, and for feeding the sum to said exposure CRT.

5. A shading correction device as defined in claim 4, wherein said reference subject is a gray scale plate of uniform density.

* * * * *